US012669064B1

(12) United States Patent
Banhos et al.

(10) Patent No.: US 12,669,064 B1
(45) Date of Patent: Jun. 30, 2026

(54) BLADE OUTER AIR SEAL SEGMENT ASSEMBLY USING SLEEVE-RAIL CONFIGURATION AND METHOD

(71) Applicant: RTX CORPORATION, Farmington, CT (US)

(72) Inventors: Jonas Banhos, West Hartford, CT (US); James T Roach, Vernon, CT (US); Russell Kim, Temecula, CA (US); Raymond Surace, Newington, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/225,216

(22) Filed: Jun. 2, 2025

(51) Int. Cl.
*F01D 11/08* (2006.01)

(52) U.S. Cl.
CPC .......... *F01D 11/08* (2013.01); *F05D 2240/11* (2013.01); *F05D 2300/6033* (2013.01)

(58) Field of Classification Search
CPC .......... F01D 11/08; F01D 25/246; F01D 9/04; F01D 25/005; F01D 11/005; F01D 25/28; F01D 11/008; F01D 11/12; F01D 11/18; F01D 11/125; F01D 25/24; F01D 25/243; F01D 5/14; F01D 5/282; F01D 11/001; F01D 11/025; F01D 11/122; F01D 5/284; F01D 11/22; F05D 2300/6033; F05D 2240/11; F05D 2240/55; F05D 2220/32; F05D 2260/30; F05D 2260/941; F05D 2220/3212; F05D 2300/10; F05D 2250/61; F05D 2260/36; F05D 2260/38; F05D 2260/52; F05D 2300/177; F04D 29/023; F04D 29/083
See application file for complete search history.

(56) References Cited

U.S. PATENT DOCUMENTS

| | | | | |
|---|---|---|---|---|
| 6,702,550 | B2 | 3/2004 | Darkins, Jr. et al. | |
| 10,519,790 | B2 | 12/2019 | Hafner et al. | |
| 10,704,407 | B2 * | 7/2020 | Barrett | F01D 11/08 |
| 10,808,575 | B2 * | 10/2020 | Taxacher | F01D 25/28 |
| 10,865,654 | B2 * | 12/2020 | Hafner | F01D 11/005 |
| 11,021,987 | B2 | 6/2021 | Clark et al. | |
| 11,041,399 | B2 * | 6/2021 | Lutjen | F01D 5/14 |
| 11,236,629 | B2 | 2/2022 | Kusumoto et al. | |
| 2015/0345308 | A1 | 12/2015 | Roberts, Jr. et al. | |
| 2021/0079804 | A1 * | 3/2021 | Clark | F01D 11/08 |
| 2024/0167391 | A1 | 5/2024 | Rogers et al. | |

* cited by examiner

*Primary Examiner* — Eric J Zamora Alvarez
(74) *Attorney, Agent, or Firm* — Christopher B. Kilner; MILLEN, WHITE, ZELANO & BRANIGAN

(57) ABSTRACT

A blade outer air seal (BOAS) segment of a gas turbine engine includes a support component extending circumferentially in an arc and an arcuate ceramic matrix composite (CMC) sleeve that slides onto the support component. The support component may be made of metal such as a high Nickel (Ni) content alloy or a high Cobalt (Co) content alloy and includes a pair of rails. The CMC sleeve can be formed of a plurality of stacked plies to have a uniform thickness, and include arcuate upstream and downstream curves to engage the pair of rails. The CMC sleeve can be uniformly densified and maintain a uniform thermal gradient. A flexible insulation blanket formed of carbon/graphite felt may be disposed between the rails of the support component and the CMC sleeve to avoid the need to cool the support component.

11 Claims, 3 Drawing Sheets

BLADE OUTER AIR SEAL SEGMENT ASSEMBLY USING SLEEVE-RAIL CONFIGURATION AND METHOD

FIELD OF THE INVENTION

The subject matter disclosed herein relates to blade outer air seal (BOAS) components as used in gas turbine engines and, in particular, to a BOAS segment assembly using a ceramic matrix composite (CMC) sleeve that slides onto a rail.

BACKGROUND OF THE INVENTION

Gas turbine engines or jet engines, in general, include a fan section, a compressor section, a combustion section, and a turbine section. Air enters through the fan section and is compressed in the compressor section before being introduced into the combustion section. In the combustion section, the air is mixed with fuel and ignited to generate a high-energy, high temperature gas flow. The high-energy, high temperature gas flow is expanded in the turbine section which is used to create thrust and to drive the compressor and fan sections.

Certain components of gas turbine engines are thus exposed to the high-energy, high temperature gas flow (flow path components). One such component is the blade outer air seal (BOAS, also sometimes referred to as a blade shroud or duct) which contributes to the hot flow path by maintaining a flow boundary at the radially outer most surface. BOAS are circumferentially distributed and are formed of segments, typically with slot seals between the segments. Therefore, it is desirable that such components be made of heat-resistant materials such as ceramic matrix composites (CMCs). Full CMC BOAS segment layups may be constructed with a common bottom-top layup approach.

CMC components can withstand much higher operating temperatures than components composed of superalloys. However, CMC components have comparably lower thermal conductivity. To increase their operational lifespans, precautions are typically taken to cool CMC gas path components by subjecting the components to a flow of cooling fluid (e.g., air). Accordingly, CMC BOAS segments may be internally cooled with bleed air from the compressor. The cooling air may pass through passageways in the seal body and exit outlet ports in the inboard or inner diameter (ID) side of the body (to film cool the ID face). Air may also exit along the circumferential ends (mate faces) of the CMC BOAS segments to be vented into the adjacent inter-segment region (e.g., to help cool feather seal segments sealing the adjacent CMC BOAS segments).

The thermal gradient of such CMC BOAS segments is mostly vertical (i.e., radial in the gas turbine engine), which may create distortions within the CMC BOAS segment (e.g., warping). Stresses in such CMC BOAS segments are mostly induced by thermal gradients, but may also have a pressure contribution.

The above information disclosed in this Background section is only for understanding of the background of the inventive concepts and, therefore, it may contain information that does not constitute prior art.

SUMMARY OF THE INVENTION

The present disclosure is directed, in a first aspect, to a blade outer air seal (BOAS) segment of a gas turbine engine a support component and a ceramic matrix composite (CMC) sleeve. The support component extends circumferentially in an arc, and has a substantially uniform axial cross section that includes: a central portion extending substantially axially from an upstream end to a downstream end; a first support flange extending radially outward from the upstream end of the central portion; a second support flange extending radially outward from the downstream end of the central portion; a first rail extending axially from the upstream end of the central portion, the first rail terminating with a first circular cross section; and a second rail extending axially from the downstream end of the central portion, the second rail terminating with a second circular cross section. The CMC sleeve also extends circumferentially in an arc, and is formed of a plurality of stacked plies to have a substantially uniform thickness. The CMC sleeve has a substantially uniform axial cross section that includes: an arcuate upstream curve dimensioned to slide onto the first circular cross section; an arcuate downstream curve dimensioned to slide onto the second circular cross section; and an axial portion extending between the arcuate upstream curve and the arcuate downstream curve. The CMC sleeve can be attached to the support component by circumferentially sliding onto the first and second rails.

In an embodiment of the BOAS segment, the support component may be formed of metal.

In a further embodiment of the BOAS segment, the metal may be a high Nickel (Ni) content alloy or a high Cobalt (Co) content alloy.

In any of the foregoing embodiments of the BOAS segment, a diameter of the first circular cross section may be larger than a thickness a remainder of the first rail, and a diameter of the second circular cross section may be larger than a thickness of a remainder of the second rail.

In any of the foregoing embodiments of the BOAS segment, the arcuate upstream curve may be dimensioned to wrap around more than 180° of the first circular cross section, and the arcuate downstream curve may be dimensioned to wrap around more than 180° of the second circular cross section.

In any of the foregoing embodiments of the BOAS segment, the first rail may further extend radially inward from the upstream end of the central portion, and the second rail may further extend radially inward from the downstream end of the central portion. One or more embodiment of this BOAS segment may further comprise a flexible insulation blanket formed of carbon/graphite felt disposed on an inside surface of the CMC sleeve. Embodiments of the BOAS segment with the flexible insulation blanket may further comprise a metal leaf spring disposed between the first and second rails of the support component and the flexible insulation blanket to drive the flexible insulation blanket against the CMC sleeve.

In any of the foregoing embodiments of the BOAS segment, the arcuate upstream curve may be dimensioned to accommodate the flexible insulation blanket and an upstream end of the metal leaf spring disposed on the first circular cross section, and the arcuate downstream curve may be dimensioned to accommodate the flexible insulation blanket and a downstream end of the metal leaf spring disposed on the second circular cross section.

The present disclosure is also directed, in a second aspect, to a blade outer air seal (BOAS) segment of a gas turbine engine. The BOAS segment includes a metal support component extending circumferentially in an arc, the metal support component formed of a high Nickel (Ni) content alloy or a high Cobalt (Co) content alloy. The metal support component has a substantially uniform axial cross section that includes: a central portion extending substantially axially from an upstream end to a downstream end; a first support flange extending radially outward from the upstream end of the central portion; a second support flange extending radially outward from the downstream end of the central portion; a first rail extending axially from the upstream end of the central portion, the first rail terminating with a first circular cross section having a diameter greater than a thickness of a remainder of the first rail; and a second rail extending axially from the downstream end of the central portion, the second rail terminating with a second circular cross section having a diameter greater than a thickness of a remainder of the second rail. The BOAS segment also includes a ceramic matrix composite (CMC) sleeve extending circumferentially in an arc, the CMC sleeve formed of a plurality of stacked plies to have a substantially uniform thickness and having a substantially uniform axial cross section that includes: an arcuate upstream curve; an arcuate downstream curve; and an axial portion extending between the arcuate upstream curve and the arcuate downstream curve. The BOAS segment further includes a flexible insulation blanket formed of carbon/graphite felt disposed on an inside surface of the CMC sleeve, wherein the CMC sleeve may be attached to the support component by circumferentially sliding onto the first and second rails with the flexible insulation blanket disposed therebetween.

In an embodiment, the BOAS segment may further include a metal leaf spring disposed between the first and second rails of the metal support component and the flexible insulation blanket to drive the flexible insulation blanket against the CMC sleeve.

In any of the foregoing embodiments of the BOAS segment, the arcuate upstream curve may be dimensioned to accommodate the flexible insulation blanket and an upstream end of the metal leaf spring disposed on the first circular cross section and wrap around more than 180° of the first circular cross section, and the arcuate downstream curve may be dimensioned to accommodate the flexible insulation blanket and a downstream end of the metal leaf spring disposed on the second circular cross section and wrap around more than 180° of the second circular cross section.

The present disclosure is further directed, in a third aspect, to a method of assembling a blade outer air seal (BOAS) segment of a gas turbine engine. The method includes: providing a support component extending circumferentially in an arc, the support component having a substantially uniform axial cross section that has a central portion extending substantially axially from an upstream end to a downstream end, a first support flange extending radially from the upstream end of the central portion, a second support flange extending radially from the downstream end of the central portion, a first rail extending axially from the upstream end of the central portion, the first rail terminating with a first circular cross section, and a second rail extending axially from the downstream end of the central portion, the second rail terminating with a second circular cross section. The method further includes: attaching a ceramic matrix composite (CMC) sleeve extending circumferentially in an arc to the support component by circumferentially sliding the CMC sleeve onto the first and second rails, the CMC sleeve formed of a plurality of stacked plies to have a substantially uniform thickness and having a substantially uniform axial cross section that has an arcuate upstream curve dimensioned to slide onto the first circular cross section, an arcuate downstream curve dimensioned to slide onto the second circular cross section, and an axial portion extending between the arcuate upstream curve and the arcuate downstream curve.

An embodiment of the method may further include forming the support component of a high Nickel (Ni) content alloy or a high Cobalt (Co) content alloy.

Any of the foregoing embodiments of the method may further include dimensioning a diameter of the first circular cross section to be larger than a thickness of first rail, and dimensioning a diameter of the second circular cross section to be larger than a thickness of second rail.

Any of the foregoing embodiments of the method may include dimensioning the arcuate upstream curve to wrap around more than 180° of the first circular cross section, and dimensioning the arcuate downstream curve to wrap around more than 180° of the second circular cross section.

In any of the foregoing embodiments of the method, the first rail may further extend radially inward from the upstream end of the central portion, and the second rail may further extend radially inward from the downstream end of the central portion.

Any of the foregoing embodiments of the method may further include sliding an upstream end and a downstream end of a metal leaf spring onto the first and second rails of the support component.

Any of the foregoing embodiments of the method may further include disposing a flexible insulation blanket formed of carbon/graphite felt onto an inner surface of the CMC sleeve, and when the CMC sleeve is attached, the metal leaf spring may drive the flexible insulation blanket against the CMC sleeve.

Any of the foregoing embodiments of the method may include dimensioning the arcuate upstream curve of the CMC sleeve to accommodate the flexible insulation blanket and the upstream end of the metal leaf spring disposed on the first circular cross section, and dimensioning the arcuate downstream curve of the CMC sleeve to accommodate the flexible insulation blanket and the downstream end of the metal leaf spring disposed on the second circular cross section.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

Figure 1:
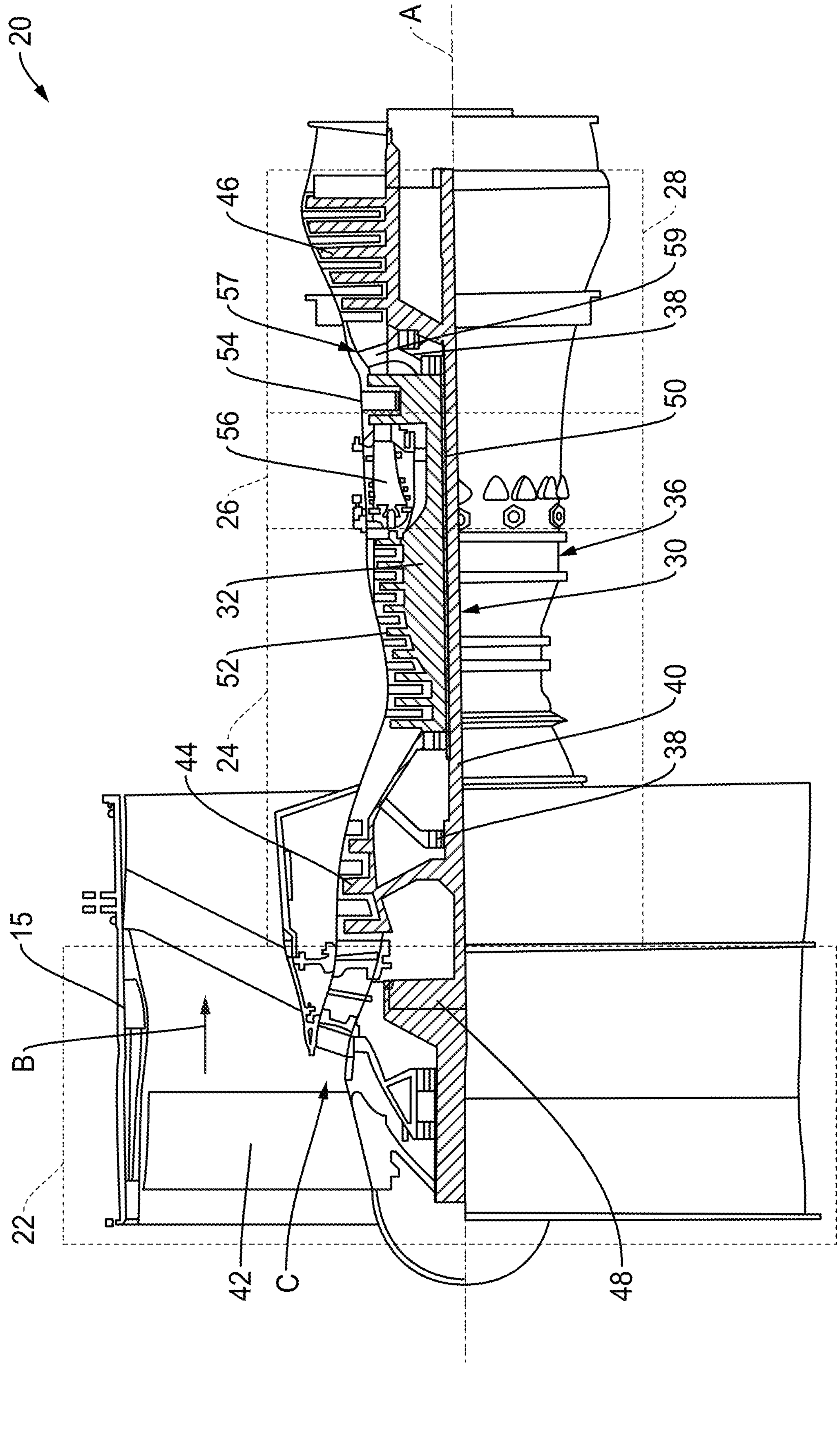
FIG. 1 schematically illustrates a partial cross section of an exemplary gas turbine engine.

The embodiments of the present disclosure can comprise, consist of, and consist essentially of the features and/or steps described herein, as well as any of the additional or optional ingredients, components, steps, or limitations described herein or would otherwise be appreciated by one of skill in the art.

The following discussion omits or only briefly describes conventional features of the disclosed technology that are apparent to those skilled in the art. Reference to a particular embodiment does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. A person of ordinary skill in the art would know how to use the instant invention, in combination with routine experiments, to achieve other outcomes not specifically disclosed in the examples or the embodiments.

Unless otherwise specifically defined herein, all terms are to be given their broadest possible interpretation including meanings implied from the specification as well as meanings understood by those skilled in the art and/or as defined in dictionaries, treatises, etc. Unless defined otherwise, all technical and scientific terms used herein have the same meaning as commonly understood by one of ordinary skill in the art in the field of the disclosed technology. It must also be noted that, as used in the specification and the appended claims, the singular forms “a,” “an,” and “the” include plural referents unless otherwise specified, and that the terms “includes” and/or “including,” when used in this specification, specify the presence of stated features, elements, and/or components, but do not preclude the presence or addition of one or more other features, steps, operations, elements, components, and/or groups thereof. Additionally, methods, equipment, and materials similar or equivalent to those described herein can also be used in the practice or testing of the disclosed technology.

The devices of the present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. All spatial references, such as, for example, proximal, distal, horizontal, vertical, top, upper, lower, bottom, left and right, are for illustrative purposes only and can be varied within the scope of the disclosure. For example, the references “upper” and “lower” are relative and used only in the context to the other, and are not necessarily “superior” and “inferior.”

It will further be understood that, although the terms “first,” “second,” “third,” and the like may be used herein to describe various elements, these elements should not be limited by these terms. These terms are only used to distinguish one element from another element. Thus, “a first element” discussed below could be termed “a second element” or “a third element,” and “a second element” and “a third element” may be termed likewise without departing from the teachings herein.

Various examples of the disclosed technology are provided throughout this disclosure. The use of these examples is illustrative only, and in no way limits the scope and meaning of the invention or of any exemplified form. Likewise, the invention is not limited to any particular preferred embodiment(s) described herein. Indeed, modifications and variations of the invention may be apparent to those skilled in the art upon reading this specification, and can be made without departing from its spirit and scope. The invention is therefore to be limited only by the terms of the claims, along with the full scope of equivalents to which the claims are entitled.

To reduce thermal stress and associated warping in CMC BOAS segments, different shapes and/or layup configurations may provide an improved bending response and/or improved thermal pathways. A more organic shape is disclosed herein that allows for a sandwich-structure bending response, improved densifications pathways for the CMC layups, simplified preforming, and new cooling schemes for the CMC BOAS segments.

The present disclosure is directed to a blade outer air seal (BOAS) segment of a gas turbine engine that includes a support component extending circumferentially in an arc, and an arcuate ceramic matrix composite (CMC) sleeve that slides onto the support component. The support component may be made of metal such as a high Nickel (Ni) content alloy or a high Cobalt (Co) content alloy and includes a pair of rails. The CMC sleeve can be formed of a plurality of stacked plies to have a uniform thickness, and include arcuate upstream and downstream curves to engage the pair of rails. The CMC sleeve can be uniformly densified and maintain a uniform thermal gradient. A flexible insulation blanket formed of carbon/graphite felt may be disposed between the rails of the support component and the CMC sleeve to avoid the need to cool the support component.

In the discussion below, axial refers to a direction that coincides with the longitudinal axis of the engine. Radial refers to a direction that is radial with respect to the longitudinal axis of the engine. Circumferential refers to a direction that corresponds to the circumference of a circle around the longitudinal axis of the engine. The leading edge/portion of a structure is the edge/portion that faces into the flow of the hot gases, i.e., faces upstream. The trailing edge/portion of a structure is the edge/portion that the faces away from the flow of the hot gases, i.e., faces downstream.

FIG. 1 schematically illustrates an example of a gas turbine engine 20 (i.e., a two-spool turbofan) which includes a fan section 22, a compressor section 24, a combustor section 26, and a turbine section 28. Fan section 22 drives air along a bypass flow path B in a bypass duct defined within a housing 15, and also along a core flow path C for compression in compressor section 24, with subsequent introduction into combustor section 26, followed by expansion through turbine section 28. Although FIG. 1 depicts a two-spool turbofan gas turbine engine, it should be understood that the concepts described herein are not limited to use with two-spool turbofan engines and may be applied to other types of turbine engines.

Engine 20 generally includes a low speed spool 30 and a high-speed spool 32 mounted for rotation about an engine central longitudinal axis A, relative to an engine static structure 36, via several bearing systems 38. Various bearing systems 38 at various locations may alternatively or additionally be provided. The location of bearing systems 38 may be varied as appropriate to the application.

The low speed spool 30 generally includes an inner shaft 40 that interconnects, a first (or low) pressure compressor 44 and a first (or low) pressure turbine 46. Inner shaft 40 is connected to fan 42 through a speed change mechanism, which in this exemplary embodiment is illustrated as a geared structure 48 to drive fan 42 at a lower speed than the low speed spool 30. High speed spool 32 includes an outer shaft 50 that interconnects a second (or high) pressure compressor 52 and a second (or high) pressure turbine 54. Combustor 56 is positioned between high pressure compressor 52 and high-pressure turbine 54. A mid-turbine frame 57 of the engine static structure 36 may be arranged generally between the high-pressure turbine 54 and the low-pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core air flow is first compressed by low pressure compressor 44, and then by the high-pressure compressor 52. Thereafter, the core air flow is mixed and burned with fuel in combustor 56, then expanded in high pressure turbine 54 and low-pressure turbine 46. The mid-turbine frame 57 includes airfoils 59 which are in the core airflow path C. The turbines 46 and 54 rotationally drive the respective low speed spool 30 and high-speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low-pressure compressor, or aft of the combustor section 26 or even aft of turbine section 28, and fan 42 may be positioned forward or aft of the location of gear system 48.

The turbine section 28 includes at least one rotor and at least one blade extending radially outwardly from the rotor. The turbine section 28 may further include a blade outer air seal(s) (BOAS(s)). The blade outer air seal can be an assembly of a plurality of BOAS segments that together form an annular shaped shroud around the engine's central longitudinal axis A which is positioned between an outer casing of the engine and the turbine blade(s) of the turbine section.

Figure 2A:
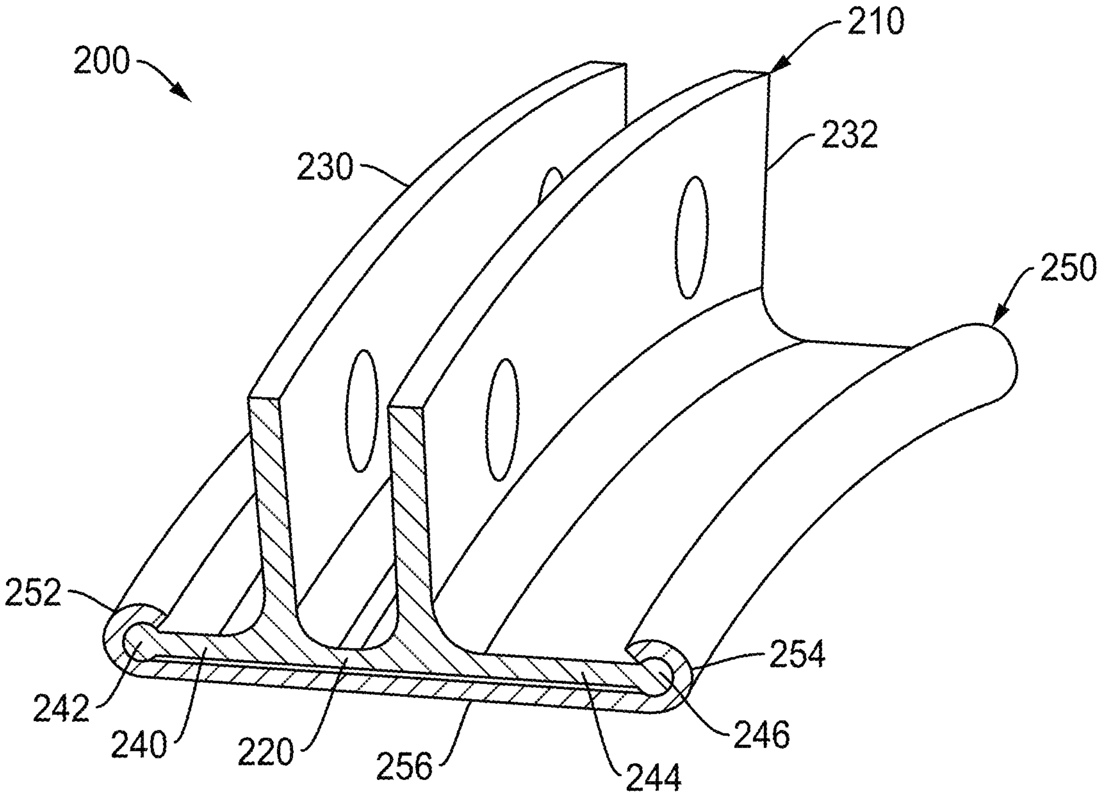
FIG. 2A schematically illustrates a perspective view of an example embodiment of a BOAS segment assembly in accordance with the present disclosure.
Figure 2B:
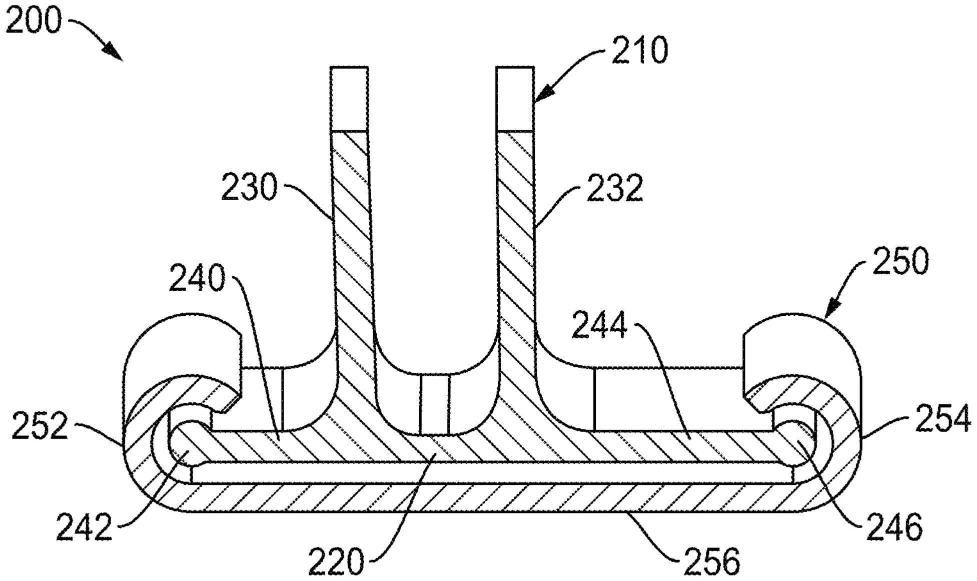
FIG. 2B schematically illustrates an exaggerated cross section view of the example embodiment of FIG. 2A in accordance with the present disclosure.

With reference to FIGS. 2A and 2B, an embodiment of a BOAS segment 200 in accordance with the present disclosure is illustrated, with gaps exaggerated in FIG. 2B. The BOAS segment 200 includes a support component 210 extending circumferentially in an arc, and a CMC sleeve 250 that also extends circumferentially in an arc. In one or more embodiments, the support component 210 may be made of metal, such as a high Nickel (Ni) content alloy or a high Cobalt (Co) content alloy.

The support component 210 has a substantially uniform axial cross section. The cross section includes a central portion 220 extending substantially axially from an upstream end to a downstream end, a first support flange 230 extending radially outward from the upstream end of the central portion 220, and a second support flange 232 extending radially outward from the downstream end of the central portion 220. The first support flange 230 and the second support flange 232 may be used for connection to a supporting structure and may, for example, feature holes for attachment pins or other hardware.

The cross section of support component 210 also includes a first rail 240 extending axially from the upstream end of the central portion 220, the first rail 240 terminating with a first circular cross section 242. The cross section of support component 210 further includes a second rail 244 extending axially from the downstream end of the central portion 220, the second rail 244 similarly terminating with a second circular cross section 246.

The CMC sleeve 250 is formed of a plurality of stacked plies to have a substantially uniform thickness. By being formed in this manner, densification of CMC sleeve 250 may be more complete/uniform, and the uniform thickness permits a more uniform thermal gradient when exposed to the high temperature gas flow of the gas turbine engine. For the stacked plies, a ply thickness may range between about 0.006" to 0.018" and the number of plies may range between about 6 to 30 plies. The CMC may be formed of any suitable type, including but not limited to Silicon Carbide (SiC)/SiC, Aluminum Oxide ($Al_2O_3$)/$Al_2O_3$, Carbon (C)/C and SiC/Silicon Carbonitride (SiNC) produced by any suitable method, including but not limited to chemical vapor infiltration (CVI), melt infiltration (MI), polymer infiltration and pyrolysis (PIP) and hybrids thereof.

The CMC sleeve 250 has a substantially uniform axial cross section that includes an arcuate upstream curve 252 dimensioned to slide onto the first circular cross section 242, an arcuate downstream curve 254 dimensioned to slide onto the second circular cross section 246, and an axial portion 256 extending between the arcuate upstream curve 252 and the arcuate downstream curve 254. With such a configuration, the CMC sleeve 250 can be attached to the support component 210 by circumferentially sliding onto the first and second rails 240 and 244.

To minimize friction and thermal contact between CMC sleeve 250 and the first and second rails 240 and 244 to the area of the arcuate upstream curve 252 and the arcuate downstream curve 254, a diameter of the first circular cross section 242 may be larger than a thickness of a remainder of the first rail 240, and a diameter of the second circular cross section 246 may be larger than a thickness of a remainder of the second rail 244.

In one or more embodiments, the arcuate upstream curve 252 may be dimensioned to wrap around more than 180° of the first circular cross section 242 and the arcuate downstream curve 254 may be dimensioned to wrap around more than 180° of the second circular cross section 246 to make the connections more secure and increase the bending strength of the CMC sleeve 250.

Figure 3:
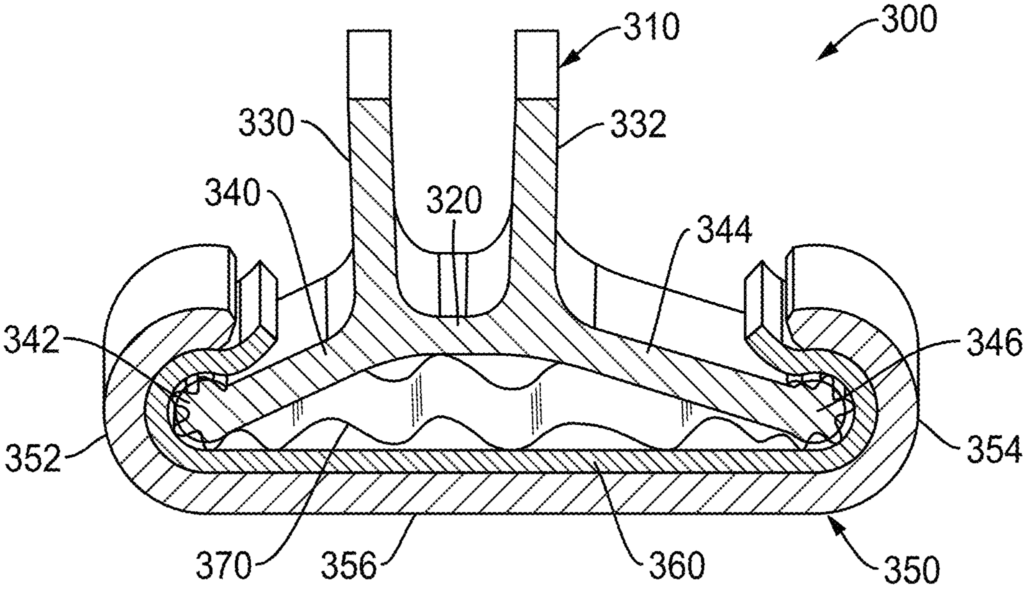
FIG. 3 schematically illustrates a cross section of a further example embodiment of a BOAS segment assembly in accordance with the present disclosure.

FIG. 3 illustrates another embodiment of a BOAS segment 300 in accordance with the present disclosure, with like elements having like reference numerals. As with the embodiment of FIGS. 2A and 2B, the BOAS segment 300 includes a support component 310 extending circumferentially in an arc, and a CMC sleeve 350 that also extends circumferentially in an arc. In one or more embodiments, the support component 310 may be made of metal, such as a high Nickel (Ni) content alloy or a high Cobalt (Co) content alloy.

In a similar manner, the CMC sleeve 350 is formed of a plurality of stacked plies to have a substantially uniform thickness. By being formed in this manner, densification of CMC sleeve 350 may be more complete/uniform, and the uniform thickness permits a more uniform thermal gradient when exposed to the high temperature gas flow of the gas turbine engine.

The support component 310 differs from the support component 210 in that the first rail 340, in addition to extending axially, further extends radially inward from the upstream end of the central portion 320, and the second rail 344, in addition to extending axially, further extends radially inward from the downstream end of the central portion 320.

The BOAS segment 300 may further include a flexible insulation blanket 360 formed of carbon/graphite felt disposed between the first and second rails 340 and 344 of the support component 310 and the CMC sleeve 350. The flexible insulation blanket 360 may be thin carbon felt or graphite felt such as those available from HPMS Graphite of Woodland Hills, CA. As illustrated in FIG. 3, the dimension of the flexible insulation blanket 360 may be such as to slightly extend beyond the contact points of the CMC sleeve 350 and the support component 310.

In one or more embodiments, a metal leaf spring 370 may be disposed between the first and second rails 340 and 344 of the support component 310 and the flexible insulation blanket 360 to drive the flexible insulation blanket 360 against an inside of the CMC sleeve 350.

With respect to CMC sleeve, the arcuate upstream curve 352 may be dimensioned to accommodate portions of the flexible insulation blanket 360 and the metal leaf spring 370 disposed on the first circular cross section 342, and the arcuate downstream curve 354 may be dimensioned to accommodate portions of the flexible insulation blanket 360 and the metal leaf spring 370 disposed on the second circular cross section 346.

The arrangement of BOAS segment 300 permits additional air gaps and possible cooling spaces to keep the support component 310 cooler and permit greater and more uniform heating of the CMC sleeve 350.

Thus, in an embodiment of the present disclosure, the CMC segment 300 of a gas turbine engine may include a metal support component 310 extending circumferentially in an arc, the metal support component 310 formed of a high Nickel (Ni) content alloy or a high Cobalt (Co) content alloy, and having a substantially uniform axial cross section. The axial cross section may include a central portion 320 extending substantially axially from an upstream end to a downstream end, a first support flange 330 extending radially outward from the upstream end of the central portion 320, a second support flange 332 extending radially outward from the downstream end of the central portion 320, a first rail 340 extending axially from the upstream end of the central portion 320, the first rail 340 terminating with a first circular cross section 342 having a diameter greater than a thickness of a remainder of the first rail 340, and a second rail 344 extending axially from the downstream end of the central portion 320, the second rail 344 terminating with a second circular cross section 346 having a diameter greater than a thickness of a remainder of the second rail 344.

The BOAS segment 300 may also include a CMC sleeve 350 extending circumferentially in an arc, the CMC sleeve 350 formed of a plurality of stacked plies to have a substantially uniform thickness and having a substantially uniform axial cross section that includes an arcuate upstream curve 352, an arcuate downstream curve 354, and an axial portion 356 extending between the arcuate upstream curve 352 and the arcuate downstream curve 354.

The BOAS segment 300 may further include a flexible insulation blanket 360 formed of carbon/graphite felt disposed between the first and second rails 340 and 344 of the support component 310 and the CMC sleeve 350, wherein the CMC sleeve 350 is attached to the support component 310 by circumferentially sliding onto the first and second rails 340 and 344 with the flexible insulation blanket 360 disposed therebetween. In one or more embodiments, a metal leaf spring 370 may be disposed between the first and second rails 340 and 344 of the metal support component 310 and the flexible insulation blanket 360 to drive the flexible insulation blanket 360 against an inside surface of the CMC sleeve 350.

In such embodiments of BOAS segment 300, the arcuate upstream curve 352 may be dimensioned to accommodate portions of the flexible insulation blanket 360 and the metal leaf spring 370 disposed on the first circular cross section 342 and wrap around more than 180° of the first circular cross section 342, and the arcuate downstream curve 354 may be dimensioned to accommodate portions of the flexible insulation blanket 360 and the metal leaf spring 370 disposed on the second circular cross section 346 and wrap around more than 180° of the second circular cross section 346.

Figure 4:
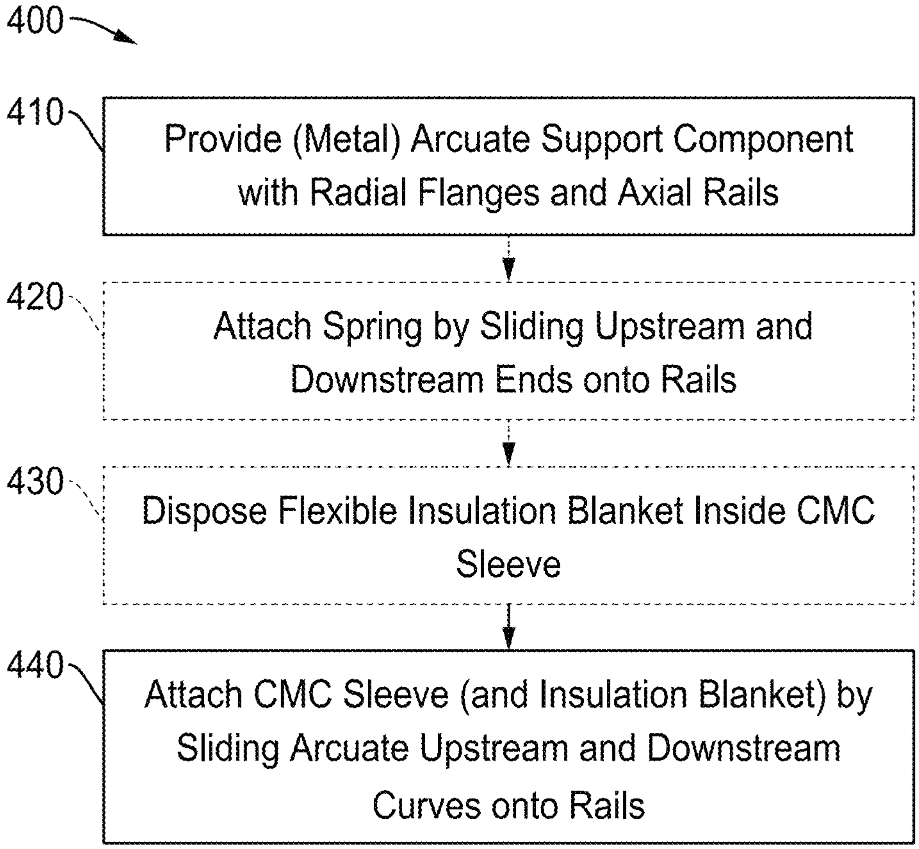
FIG. 4 is a flow diagram of an example method in accordance with the present disclosure.

With reference to FIG. 4, a flow diagram of a method 400 for assembling a BOAS segment of a gas turbine engine is disclosed.

Method 400 includes a step 410 of providing a support component extending circumferentially in an arc, the support component having a substantially uniform axial cross section that includes: a central portion extending substantially axially from an upstream end to a downstream end; a first support flange extending radially from the upstream end of the central portion; a second support flange extending radially from the downstream end of the central portion; a first rail extending axially from the upstream end of the central portion, the first rail terminating with a first circular cross section; and a second rail extending axially from the downstream end of the central portion, the second rail terminating with a second circular cross section.

One or more embodiments of method 400 may include forming the support component of a high Nickel (Ni) content alloy or a high Cobalt (Co) content alloy. Embodiments of method 400 may also include dimensioning a diameter of the first circular cross section to be larger than a thickness of first rail, and dimensioning a diameter of the second circular cross section to be larger than a thickness of second rail.

Certain embodiments of method 400 may also include an optional step 420 of attaching a metal leaf spring having upstream and downstream ends to the rails by sliding the upstream and downstream ends onto the rails. Such embodiments may also include a step 430 of disposing a flexible insulation blanket formed of carbon/graphite felt onto an inner surface of the CMC sleeve. When assembled with a metal leaf spring between the first and second rails of the support component and the flexible insulation blanket, the metal leaf spring will act to drive the flexible insulation blanket against the CMC sleeve.

Such embodiments of method 400 may further include dimensioning the arcuate upstream curve to accommodate the flexible insulation blanket and upstream end of the metal leaf spring disposed on the first circular cross section, and dimensioning the arcuate downstream curve to accommodate the flexible insulation blanket and the downstream end of the metal leaf spring disposed on the second circular cross section.

Method 400 further includes step 440 of attaching a CMC sleeve extending circumferentially in an arc to the support component by circumferentially sliding the CMC sleeve (and optional flexible insulation blanket) onto the first and second rails. The CMC sleeve is formed of a plurality of stacked plies to have a substantially uniform thickness and having a substantially uniform axial cross section that includes: an arcuate upstream curve dimensioned to slide onto the first circular cross section; an arcuate downstream curve dimensioned to slide onto the second circular cross section; and an axial portion extending between the arcuate upstream curve and the arcuate downstream curve.

One or more embodiments of method 400 may also include dimensioning the arcuate upstream curve to wrap around more than 180° of the first circular cross section, and dimensioning the arcuate downstream curve to wrap around more than 180° of the second circular cross section. In various embodiments of method 400, the first rail may further extend radially inward from the upstream end of the central portion, and the second rail may further extend radially inward from the downstream end of the central portion.

Embodiments of the present disclosure may provide various benefits. For example, the thin sleeve configuration uses a simpler shape, and can therefore maintain a more uniform thermal gradient so as to lower thermal stresses. Manufacturing can be easier, as densification can be more uniform on such a thin and continuous part. The more uniform boundary conditions of the CMC sleeve also decrease stress on the part. Technically, with these stress reductions, the CMC sleeve can be made using a full CVI process, and provide a better fit for higher thermal capability and reduced stress allowables from full CVI densification. Further, forming the support component having the rails out of metal can provide a variety of new attachment methods that can provide possibly organic shapes, a tighter envelope, and new cooling schemes (if necessary) better suited for metal applications.

Additionally, embodiments of the present disclosure may reduce the thermal gradient within the CMC BOAS segment, which in turn may reduce deflections of the CMC BOAS segment. Reduced deflections permit a reduction in the number of CMC BOAS segments without significantly impacting the clearance to the adjacent turbine blade tip. Accordingly, costs may be reduced (fewer segments) with minimal impact on engine performance.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A blade outer air seal (BOAS) segment of a gas turbine engine, comprising:
- a support component extending circumferentially in an arc, the support component having a uniform axial cross section that includes:
  - a central portion extending axially from an upstream end to a downstream end;
  - a first support flange extending radially outward from the upstream end of the central portion;
  - a second support flange extending radially outward from the downstream end of the central portion;
  - a first rail extending axially from the upstream end of the central portion, the first rail terminating with a first circular cross section; and
  - a second rail extending axially from the downstream end of the central portion, the second rail terminating with a second circular cross section; and
- a ceramic matrix composite (CMC) sleeve extending circumferentially in an arc, the CMC sleeve formed of a plurality of stacked plies to have a uniform thickness and having a uniform axial cross section that includes:
  - an arcuate upstream curve dimensioned to slide onto the first circular cross section;
  - an arcuate downstream curve dimensioned to slide onto the second circular cross section; and
  - an axial portion extending between the arcuate upstream curve and the arcuate downstream curve,
- wherein the CMC sleeve is attached to the support component by circumferentially sliding onto the first and second rails, and
- wherein the support component is formed of metal.

2. The BOAS segment of claim 1, wherein the metal is a Nickel (Ni) containing alloy or a Cobalt (Co) containing alloy.

3. The BOAS segment of claim 1, wherein the arcuate upstream curve is dimensioned to wrap around more than 180° of the first circular cross section; and
- the arcuate downstream curve is dimensioned to wrap around more than 180° of the second circular cross section.

4. The BOAS segment of claim 1, wherein the first rail further extends radially inward from the upstream end of the central portion; and
- the second rail further extends radially inward from the downstream end of the central portion.

5. The BOAS segment of claim 4, further comprising a flexible insulation blanket formed of carbon/graphite felt disposed on an inside surface of the CMC sleeve.

6. The BOAS segment of claim 5, further comprising a metal leaf spring disposed between the first and second rails of the support component and the flexible insulation blanket to drive the flexible insulation blanket against the CMC sleeve.

7. The BOAS segment of claim 6, wherein the arcuate upstream curve is dimensioned to accommodate the flexible insulation blanket and an upstream end of the metal leaf spring disposed on the first circular cross section; and
- the arcuate downstream curve is dimensioned to accommodate the flexible insulation blanket and a downstream end of the metal leaf spring disposed on the second circular cross section.

8. A blade outer air seal (BOAS) segment of a gas turbine engine, comprising:
- a support component extending circumferentially in an arc, the support component having a uniform axial cross section that includes:
  - a central portion extending axially from an upstream end to a downstream end;
  - a first support flange extending radially outward from the upstream end of the central portion;
  - a second support flange extending radially outward from the downstream end of the central portion;
  - a first rail extending axially from the upstream end of the central portion, the first rail terminating with a first circular cross section; and
  - a second rail extending axially from the downstream end of the central portion, the second rail terminating with a second circular cross section; and
- a ceramic matrix composite (CMC) sleeve extending circumferentially in an arc, the CMC sleeve formed of a plurality of stacked plies to have a uniform thickness and having a uniform axial cross section that includes:
  - an arcuate upstream curve dimensioned to slide onto the first circular cross section;
  - an arcuate downstream curve dimensioned to slide onto the second circular cross section; and
  - an axial portion extending between the arcuate upstream curve and the arcuate downstream curve, wherein the CMC sleeve is attached to the support component by circumferentially sliding onto the first and second rails, wherein a diameter of the first circular cross section is larger than a thickness of a remainder of the first rail; and a diameter of the second circular cross section is larger than a thickness of a remainder of the second rail.

9. A blade outer air seal (BOAS) segment of a gas turbine engine, comprising:

a metal support component extending circumferentially in an arc, the metal support component formed of a Nickel (Ni) containing alloy or a Cobalt (Co) containing alloy, and having a uniform axial cross section that includes:

a central portion extending axially from an upstream end to a downstream end;

a first support flange extending radially outward from the upstream end of the central portion;

a second support flange extending radially outward from the downstream end of the central portion;

a first rail extending axially from the upstream end of the central portion, the first rail terminating with a first circular cross section having a diameter greater than a thickness of a remainder of the first rail; and a second rail extending axially from the downstream end of the central portion, the second rail terminating with a second circular cross section having a diameter greater than a thickness of a remainder of the second rail;

a ceramic matrix composite (CMC) sleeve extending circumferentially in an arc, the CMC sleeve formed of a plurality of stacked plies to have a uniform thickness and having a uniform axial cross section that includes:

an arcuate upstream curve;

an arcuate downstream curve; and an axial portion extending between the arcuate upstream curve and the arcuate downstream curve; and a flexible insulation blanket formed of carbon/graphite felt disposed on an inside surface of the CMC sleeve, wherein the CMC sleeve is attached to the support component by circumferentially sliding onto the first and second rails with the flexible insulation blanket disposed therebetween.

10. The BOAS segment of claim 9, further comprising a metal leaf spring disposed between the first and second rails of the metal support component and the flexible insulation blanket to drive the flexible insulation blanket against the CMC sleeve.

11. The BOAS segment of claim 10, wherein the arcuate upstream curve is dimensioned to accommodate the flexible insulation blanket and an upstream end of the metal leaf spring disposed on the first circular cross section and wrap around more than 180° of the first circular cross section; and the arcuate downstream curve is dimensioned to accommodate the flexible insulation blanket and a downstream end of the metal leaf spring disposed on the second circular cross section and wrap around more than 180° of the second circular cross section.

* * * * *